US012623703B1

(12) United States Patent
Jordan et al.

(10) Patent No.: US 12,623,703 B1
(45) Date of Patent: May 12, 2026

(54) WHEELED CART FOR MATERIAL MANAGEMENT SYSTEM

(71) Applicants: David S. Jordan, Clinton, TN (US);
Michael C. Jordan, Heiskell, TN (US);
Scott M. Jordan, Powell, TN (US)

(72) Inventors: David S. Jordan, Clinton, TN (US);
Michael C. Jordan, Heiskell, TN (US);
Scott M. Jordan, Powell, TN (US)

(73) Assignee: iTool Equipment Holding LLC,
Clinton, TN (US)

( * ) Notice: Subject to any disclaimer, the term of this patent is extended or adjusted under 35 U.S.C. 154(b) by 335 days.

(21) Appl. No.: 18/445,526

(22) Filed: Sep. 22, 2023

(51) Int. Cl.
| | |
|---|---|
| B62B 1/12 | (2006.01) |
| B62B 1/00 | (2006.01) |
| B62B 1/26 | (2006.01) |

(52) U.S. Cl.
CPC ................ B62B 1/12 (2013.01); B62B 1/006 (2013.01); B62B 1/262 (2013.01)

(58) Field of Classification Search
CPC ........... B62B 1/12; B62B 1/006; B62B 1/262
See application file for complete search history.

(56) References Cited

U.S. PATENT DOCUMENTS

| | | | | | |
|---|---|---|---|---|---|
| 5,253,389 | A | * | 10/1993 | Colin | .................... B60B 33/066 |
| | | | | | 16/34 |
| 5,911,424 | A | * | 6/1999 | Rovinsky | ................. B62B 5/06 |
| | | | | | 280/655.1 |
| 7,784,816 | B2 | * | 8/2010 | Jian | ........................... B62B 3/02 |
| | | | | | 280/38 |
| 2022/0340186 | A1 | * | 10/2022 | Goetsch | ............... B62B 5/0086 |

FOREIGN PATENT DOCUMENTS

| | | | | | |
|---|---|---|---|---|---|
| CN | 210478742 | U | * | 5/2020 | ............ B62B 5/067 |
| JP | 2000168564 | A | * | 6/2000 | |
| JP | 2022072986 | A | * | 5/2022 | |

OTHER PUBLICATIONS

JP-2022072986-A English Translation (Year: 2022).*
JP-2000168564-A English Translation (Year: 2000).*
CN-210478742-U English Translation (Year: 2020).*

* cited by examiner

*Primary Examiner* — Michael T. Walsh
(74) *Attorney, Agent, or Firm* — Michael E. McKee

(57) ABSTRACT

A material cart of a material management system includes a base frame having a bottom surface which lies substantially in a horizontal plane and also includes a plurality of wheel-including casters which are pivotally attached to the base frame in a manner which permits a pivotal movement of the wheels of the casters relative to the frame between a condition of use and an out-of-the way condition so that no portion of the wheels of the casters is disposed beneath the horizontal plane in which the bottom surface of the base frame lies and thus enables the bottom surface of the base frame to be lowered onto the floor or underlying support surface without interference from the casters. In addition, a bearing plate embodied in the casters relieves at least some of the weight of any pivot pin used to join a caster to the base frame.

10 Claims, 4 Drawing Sheets

WHEELED CART FOR MATERIAL MANAGEMENT SYSTEM

BACKGROUND OF THE INVENTION

This invention relates generally to material management systems and relates, more particularly, to a transportable material cart upon which items are placed for use at a job site or for storage. Once items are placed thereon, the material cart can be bodily transported by way of, for example, a forklift truck, in order to move the items from one site to another. An example of a material cart having inventors in common with those of the instant invention is shown in U.S. Pat. No. D781,080.

Some material carts of the class to which this invention relates possess wheels, or casters, which enable the cart to be wheeled between two sites while the wheels move in rolling engagement with an underlying floor or support surface.

It would be desirable to provide a wheeled material cart of the aforedescribed class whose wheels can be shifted in position from a condition of use at which the wheels engage the floor or underlying support surface to enable the cart to be wheeled across the floor or underlying support surface and an out-of-the-way condition at which the wheels are prevented from interfering with the placement of the remainder of the cart flatly upon the underlying floor or support surface. One such support surface may be the bed of a truck with which the material cart can transported, or driven, from one site to another by way of the truck.

Accordingly, an object of the present invention is to provide a new and improved wheeled material cart whose wheels can be shifted in position from a condition of use which enables the cart to be wheeled, or rolled, across a floor or underlying support surface and an out-of-the-way condition at which the wheels are prevented from interfering with the placement of the remainder of the cart flatly upon the underlying floor or support surface.

Another object of the present invention is to provide such a new and improved material cart which can be positioned in a stacked relationship with material carts of like construction.

Still another object of the present invention is to provide such a material cart which is uncomplicated in construction yet effective in operation.

SUMMARY OF THE INVENTION

This invention resides in a material cart capable of supporting or storing items for use at a jobsite.

The material cart includes a base frame which defines a bottom surface which lies substantially in a horizontal plane. Also included in the cart are a plurality of wheel-including casters which are attached to the base frame. In addition, the casters are attached to the base frame in a manner which permits a pivotal movement of the wheels of the casters relative to the base frame between a condition of use at which the wheels of the casters engage the floor or underlying support surface and thereby permit the base frame to be wheeled to an alternative site and an out-of-the-way condition at which no portion of the wheels of the casters is disposed beneath the horizontal plane in which the bottom surface of the base frame lies so that the bottom surface of the base frame can be lowered onto the floor or underlying support surface without interference from the wheels of the casters.

DETAILED DESCRIPTION OF AN ILLUSTRATIVE EMBODIMENT

Figure 1:
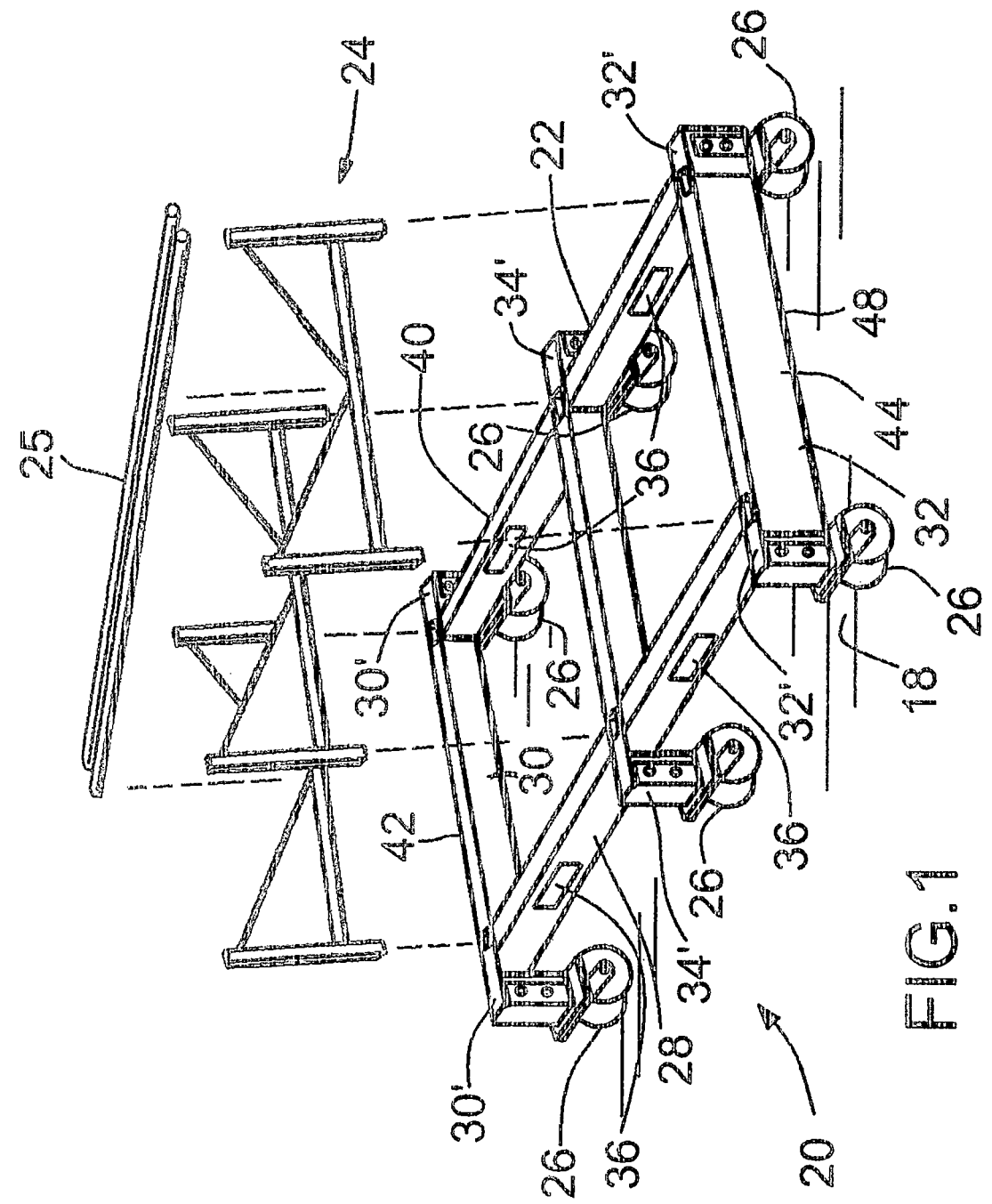
FIG. 1 is a perspective view of an embodiment of a material cart within which features of the present invention are embodied, shown exploded.

Turning now to the drawings in greater detail and considering first FIG. 1, there is illustrated an embodiment of a wheeled material cart, generally indicated 20, within which features of the present invention are embodied. Briefly, the material cart 20 includes a base frame 22 upon which a plurality of rack components, generally indicated 24, are positioned for supporting construction materials, such as conduits 25, supported by the rack components 24 for use at a job site. Meanwhile, the cart 20 also includes a plurality of (i.e. six) wheel-including casters 26 which are joined to the frame 22 for movement relative to the cart 20 between a condition of use at which the wheels of the casters 26 engage the floor 18 (or other underlying support surface) and thereby support the weight of the cart 20 (and any materials supported thereby) as the cart 20 is wheeled across the floor 18 and a condition of non-use at which the wheels of the casters 26 are disposed in an out-of-the-way condition (at which the wheels of the casters 26 are out of engagement with the floor 18) so that the frame 20 can be lowered to the floor 18 without interference from the casters 26.

With reference still to FIG. 1, the base frame 22 of the depicted material cart 20 is substantially rectangular in shape and is constructed of steel channel members 30 and 32 which are joined (i.e bolted or welded) together at the corners of the frame 22. More particularly, a pair of channel members 30 are arranged in a spaced and parallel relationship with one another to provide two opposite sides 38, 40 of the cart 20, and a pair of channel members 32 are arranged in a spaced and parallel relationship with one another to provide two opposite forward and trailing ends 42, 44, respectively, of the cart 20. In addition, there is associated with each of the channel members 30, 32 and cross member 34 an end portion 30', 32' or 34' which protrudes from a corresponding one of the opposite sides 38 and 40 of the cart 20 and which is disposed outboard of the sides 38, 40 of the frame 22. As will be apparent herein, it is through these protruding end portions 30', 32' and 34' that the wheeled casters 26 are joined to the frame 22.

Figure 2:
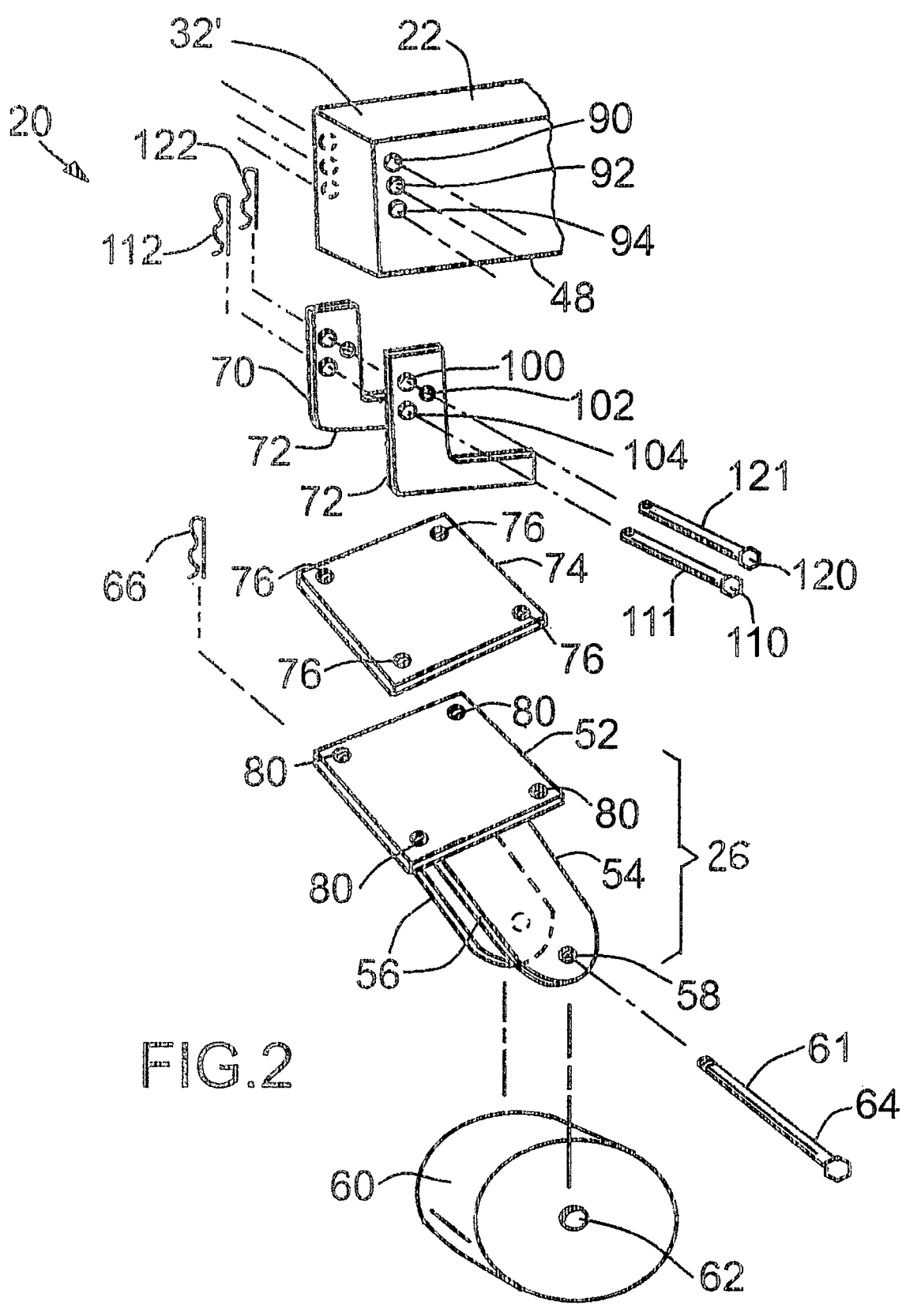
FIG. 2 is a perspective view of a fragment of the FIG. 1 material cart, shown exploded.

Each of the channel members 28, 30 which provide the opposite sides 38 or 40 of the frame 22 define a pair of spaced-apart through-openings 36 which open out of the sides 38, 40 of the frame 22 and which provide openings for the forks of a forklift truck (not shown). For a reason which will be apparent herein, the frame 22 defines a bottom 48 which, as is depicted in FIG. 2, lies in a substantially horizontal plane, indicated 46 in the side elevation views of FIGS. 4 and 5. As will be apparent herein, when each caster 26 is positioned in its out-of-the-way condition, the frame 22 is free to be placed flatly upon the floor 18 (FIGS. 1 and 4) or underlying support surface unobstructed by the wheels of the casters 26.

With reference to FIGS. 2-5 and as exemplified by the caster 26 depicted in these Figures, each caster 26 includes a support plate 52 which is substantially square in shape (as seen from above in FIG. 2) and also includes a bifurcated portion 54 having two forks 56 which are joined (e.g. welded) to the underside of the support plate 52 so that the lower ends thereof extend downwardly from the plate 52. Moreover, the support plate 52 defines a (vertically-opening) through-opening 80 adjacent each of the four corners thereof for a reason which will be apparent herein. A set of aligned through-openings 58 are defined in the forks 56 and open along horizontal axes, and a wheel 60 having a central opening 62 is positioned between the forks 56 so that the central opening 62 is aligned with the through-openings 58 defined in the forks 56. In addition, the shank, indicated 61 of a pin, or bolt 64, is directed through the aligned through-opening 58 and central opening 62 to journal the wheel 60 to the bifurcated portion 54. A key (e.g. a Cotter key) 66 is secured to the end of the bolt shank 61 opposite the head end thereof to prevent the inadvertent withdrawal of the bolt 64 from the aligned through-openings 58 and central opening 62.

Figure 3:
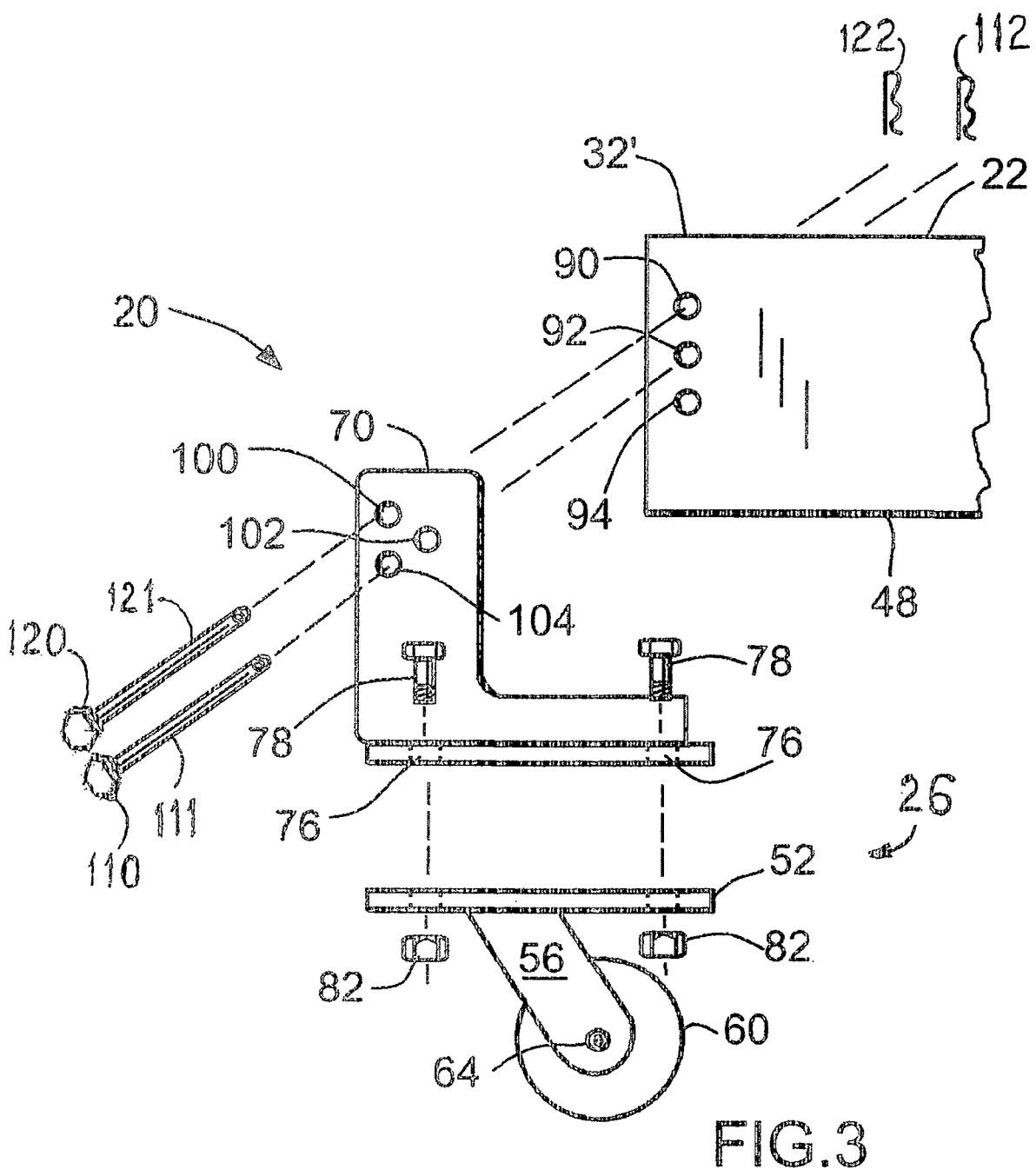
FIG. 3 is a side elevation view of the FIG. 2 fragment, as seen generally from the right in FIG. 2, shown exploded.

In addition, each caster wheel 60 is pivotally secured to a corresponding protruding portion 30', 32' or 34' (FIG. 1) of the cart frame 22. To this end and as best shown in FIGS. 2 and 3, there is associated with each caster 26 a support assembly 70 which is provided with a pair of spaced-apart legs 72 and a square-shaped bearing plate 74 which extends between and is secured to the legs 72. The bearing plate 74 defines an opening 76 adjacent each corner of the plate 74, and the shank of a bolt 78 is directed through both the opening 76 and the preformed opening 80 (introduced earlier) of the support plate 54 which is aligned with (a corresponding) opening 76 defined in the bearing plate 74. A nut 82 is securable about the shank of each bolt 76 to thereby secure the support plate 52 of the bifurcated portion 54 of the caster 26 to the support assembly 70.

Each support assembly 70 is, in turn, pivotally joined to a corresponding one of the protruding portions 30', 32' or 34' (FIG. 1) to thereby secure the casters 26 to the frame 22. To this end, each protruding portion 30', 32' or 34' is provided with a series of through-openings 90, 92 or 94 (best shown in FIG. 2) wherein each through-opening 90, 92 or 94 opens along a horizontal axis. As best shown in FIG. 3, the series of through-openings 90, 92 or 94 are grouped in somewhat of a substantially vertical arrangement. Meanwhile, the legs 72 of the support assembly 70 define a set of three through-openings 100, 102 or 104 wherein each through-opening 100, 102 or 104 opens along a substantially horizontal axis and are grouped in somewhat of a triangular arrangement.

For purposes of securing the support assembly 70 to a corresponding one of the protruding portions 30', 32' or 34', the support assembly 70 is first arranged about it corresponding protruding portion 30', 32' or 34' so that the legs 72 of the support assembly 70 are positioned on opposite sides of the protruding portion 30', 32' or 34' (as best shown in FIG. 2) and so that the through-openings 104 which are defined in the legs 72 are aligned with the through-opening 94 which is defined in the protruding portion 30', 32' or 34'. Next, the shank 111 of a bolt 110 (FIG. 2) is directed through the aligned through-openings 104, 94, and a key 112 is secured to the end of the bolt shank 111 opposite the head end thereof to prevent the inadvertent withdrawal of the bolt 110 from the aligned through-openings 104, 94. With the caster 26 thus arranged in its position depicted in FIG. 4 at which the protruding portion 30', 32' or 34' rests upon the bearing plate 74 of the support assembly 70 of the caster 26, the through-openings 100 defined in the legs 72 of the support assembly 70 are aligned with the through-opening 90 defined in the protruding portion 30', 32' or 34', and the shank 121 of a bolt 120 is directed through the aligned through-openings 100, 90, and a key 122 is secured to the end of the bolt shank 121 opposite the head end thereof to prevent the inadvertent withdrawal of the bolt 120 from the aligned openings 100, 90. With each caster 26 joined to a corresponding protruding portion 30', 32' or 34' as shown in FIG. 4 so that the wheel 60 of the caster 26 engages the floor 18 (or underlying support surface) and both bolts 110, 120 are positioned through the corresponding set of aligned openings 104, 94 and 100, 90, the caster 26 is in its position of use so that collectively, the casters 26 enable the cart 20 to be wheeled, or rolled, across the floor 18 to an alternative site.

Figure 4:
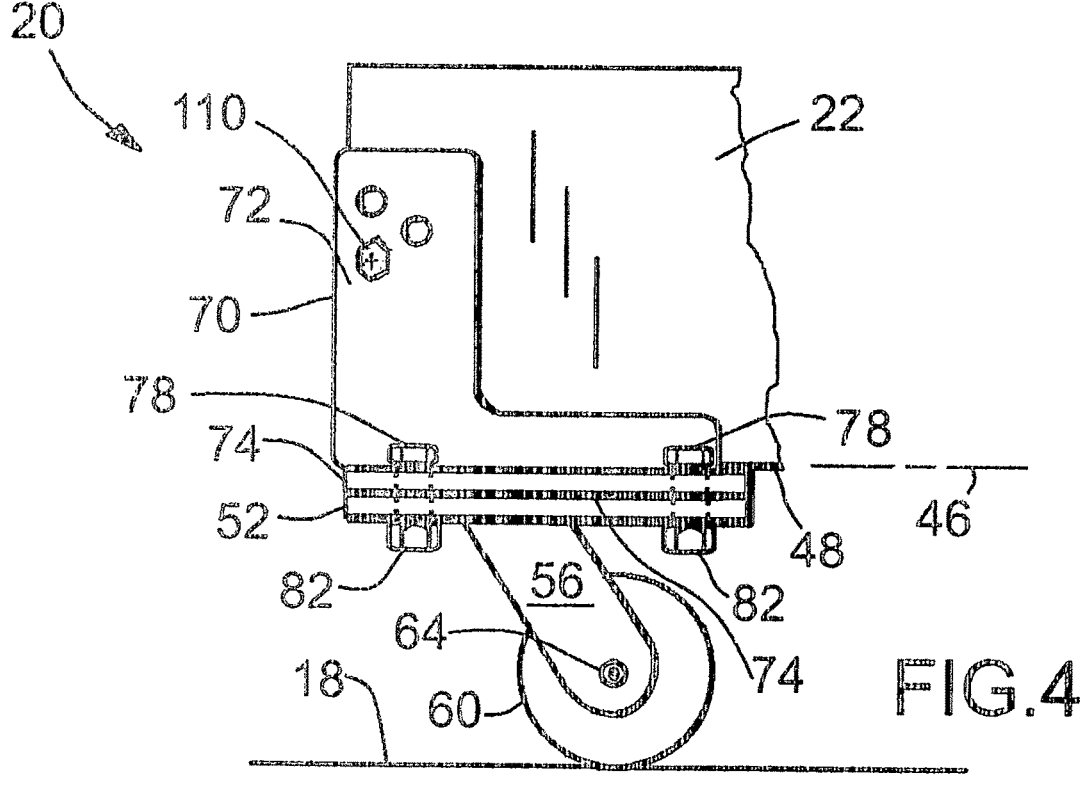
FIG. 4 is a view of the FIG. 2 fragment like that of FIG. 3, as seen generally from the right in FIG. 2, but shown assembled and with the wheel of the caster positioned in its floor-engaging condition of use.
Figure 5:
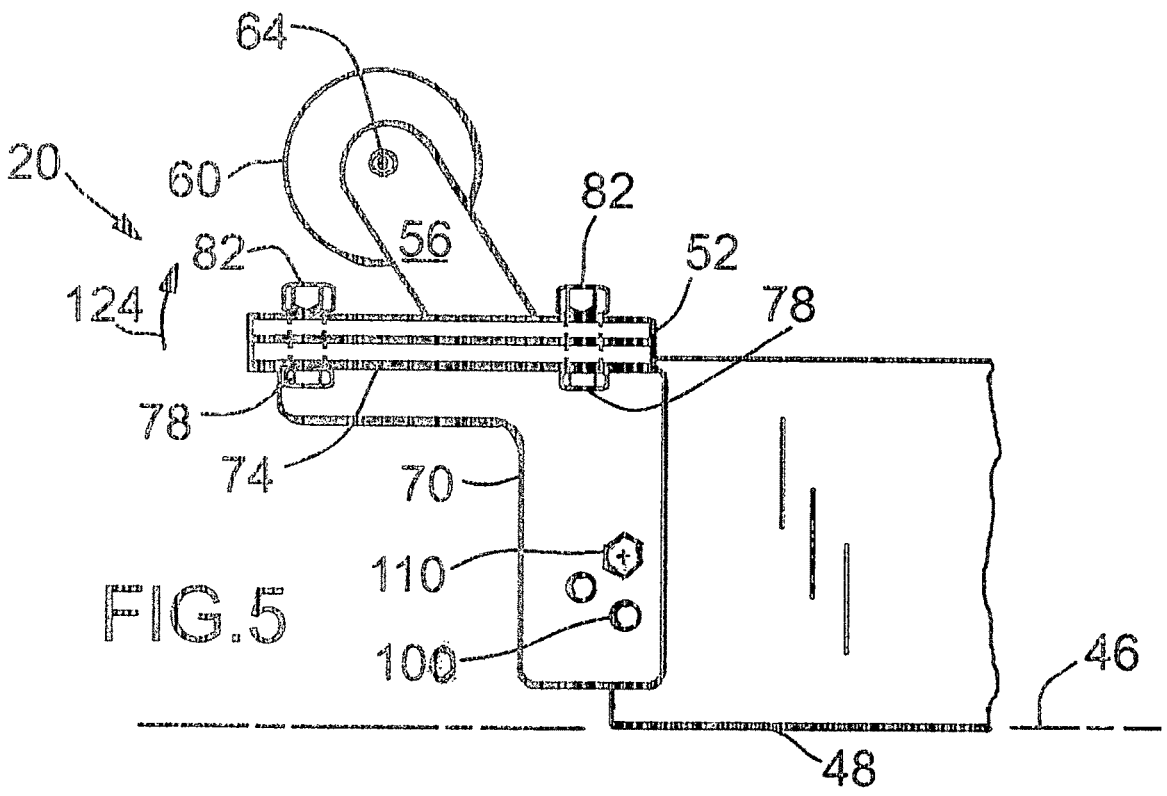
FIG. 5 is a view like that of FIG. 4, but showing the wheel of the caster in an out-of-the-way condition.

It is a feature of the aforedescribed attachment between each caster 26 and its corresponding protruding portion 30', 32' or 34' enables the caster 26 to be pivoted relative to the frame 20 from the FIG. 4 condition of use (and in the direction of the FIG. 5 arrow 124) to an out-of-the-way position (as depicted in FIG. 5) at which the caster wheel 60 no longer engages the floor 18 and is, instead, disposed to one side of the frame 20. In order to pivot the casters 26 in such a manner, the key 122 is first removed from its secured condition within the bolt shank 121 of the bolt 120, and the bolt 120 is then removed from the aligned through-openings 100, 90 so that each caster 26 is free to be pivoted in the direction of the FIG. 5 arrow 124 about the bolt shank 111 and relative to the protruding portion 30', 32' or 34' to which the caster 26 is pivotally secured. Once each caster 26 is pivoted to the out-of-the-way position, as is depicted in FIG. 5, the through-openings 102, 92 (FIG. 2) defined in the support assembly 70 and the corresponding protruding portion 30', 32' or 34' are aligned with one another. At that point, the (previously-removed) bolt 110 is directed shank-end-first through the aligned through-openings 102, 92 of the support assembly 70 and the protruding portion 30', 32' or 34' to secure the caster 26 in the FIG. 5 out-of-the-way condition.

One advantage provided by the material cart 30 (and the manner in which the casters 26 are attached to the cart frame 22 relates to the fact that upon movement of and securement of all of the casters 26 in the FIG. 5 out-of-the way condition, the base frame 22 of the cart 20 is free to be lowered onto the underlying floor 18 or other support surface, such as the bed of a truck (not shown) for transport of the cart 20 to an alternative site. In other words, once the casters 26 are each moved to and secured in place in the FIG. 5 out-of-the-way condition, the casters 26 provide no impediment or interference to the lowering of the base frame 22 (and any load supported thereby) onto the underlying floor 18. It will be understood that if any load is supported upon the base frame 22 when it is desired that the casters 26 be pivotally moved from the FIG. 4 condition of use to the FIG. 5 out-of-the-way condition, the cart frame 22 can be lifted with a forklift truck (not shown) by way of the forklift openings 36 (FIG. 1) provided in the sides 38, 40 of the frame 22. It also follows that a forklift truck can also be used to lower the cart frame 22 to an elevated condition in order for an operator to return the casters 26 from the out-of-the-way condition to the FIG. 4 condition of use. In order to return each caster 26 from the FIG. 5 out-of-the-way condition to the FIG. 4 condition of use (and re-secure the casters 26 in the FIG. 4 condition of use, the aforedescribed steps followed to move each caster 26 from the FIG. 4 condition of use to (and to secure each caster 26 in) the FIG. 5 out-of-the-way condition are reversed.

The aforedescribed capacity to lower the cart frame 22 onto an underlying support surface can be particularly advantageous if the underlying support surface is the bed of a truck for cart-transporting purposes. More specifically and if the caster wheels 60 of the cart 20 were to remain in the FIG. 4 condition of use when positioned onto the bed of a transport truck so that the caster wheels 60 were required to bear the weight of the material cart (and any load positioned thereon), the caster wheels 60 could be damaged by any shaking or jostling of the truck bed during transport. But by removing the wheel-including casters 26 from beneath the base frame 22 of the cart 20 (and securing each caster 26 in its FIG. 5 out-of-the-way condition) prior to a loading of the cart 20 onto the truck bed (so that the frame 22 of the cart 20 can rest directly upon the truck bed), any likelihood of damage to the wheels 60 of the casters 26 during transport (e.g. by way of any shaking or jostling of the truck bed) is circumvented.

Once again, it will be understood that unless the wheels 60 of the casters 26 are positioned in the FIG. 4 condition of use, the cart 20 (and any contents borne thereby) must likely be lifted by way of a forklift truck (not shown), but the provision of the forklift openings 36 (FIG. 1) provided in each side 38 or 40 of the material cart 20 accommodate the use of a forklift truck for this purpose.

Another advantage provided by the depicted cart 20 relates to the provision of the bearing plate 74 provided with each caster 26. In this connection and as best shown in FIG. 4 (at which the caster 26 is positioned in its condition of use), the base frame 22 rests directly upon the bearing plate 74, and it is through this bearing plate 74 that the weight of the caster 26 is transferred to the underlying wheel 60 of the caster 26. This means that it is the bearing plate 74 which bears the weight of the cart frame 22 (and any load supported thereby) rather than through the bolt 110 which is used to pivotally secure the caster 26 to the protruding portion 30', 32' or 34' of the cart frame 22. Thus, the provision of the bearing plates 74 within the casters 26 reduces the likelihood of damage to the bolts 110 when the weight of the material cart 20 must be borne by the casters 26.

Still another advantage provided by the material cart 20 relates to its capacity to be arranged in a stacked relationship with a material cart of identical construction to that of the aforedescribed material cart 20 of FIGS. 1-5. For example and if the rack components 24 were removed from the FIG. 1 cart 20, the cart frame 22 would be left with a (bare) upper surface which lies in a substantially horizontal plane. Meanwhile, the frame of an identical material cart—with all of its casters 26 arranged in the FIG. 5 out-of-the-way condition, could be lowered onto the upper surface of the cart frame 22 for stacking purposes. Accordingly, the capacity of the material cart 20 to be stacked with cart frames of like construction is advantageous in this respect.

It follows that a material cart 20 has been described which includes a base frame 22 which defines a bottom surface 48 which lies substantially in a horizontal plane 46 and also includes a plurality of wheel-including casters 26 which are pivotally attached to the base frame 22 in a manner which permits a pivotal movement of the wheels 60 of the casters 26 relative to the base frame 22 between a condition of use at which the wheels 60 of the casters 26 engage the floor 18 or underlying support surface and thereby permit the base frame 22 to be wheeled to an alternative site and an out-of-the-way condition at which no portion of the wheels 60 of the casters 26 is disposed beneath the horizontal plane in which the bottom surface 48 of the base frame 22 lies so that the bottom surface 48 of the base frame 22 can be lowered onto the floor 18 or underlying support surface without interference from the casters 26. Moreover, the casters 26 can be secured in either of these two conditions.

It will be understood that numerous modifications and substitutions can be had to the aforedescribed embodiment 20 without departing from the spirit of the invention. Accordingly, the aforedescribed embodiment 20 is intended for the purpose of illustration and not as limitation.

The invention claimed is:

1. A material cart comprising:
   a base frame which defines a bottom surface which lies substantially in a horizontal plane; and
   a plurality of wheel-including casters; and
   the casters are attached to the base frame in a manner which permits a pivotal movement of the wheels of the casters relative to the base frame between a condition of use at which the wheels of the casters engage the floor or underlying support surface and thereby permit the base frame to be wheeled to an alternative site and an out-of-the-way condition so that the bottom surface of the base frame can be lowered onto the floor or underlying support surface without interference from the wheels of the casters; and
   means for releasably securing the wheel-including casters to the base frame in at least one of the condition of use and the out-of-the-way condition; and
   wherein the frame includes a first set of through-openings, each caster defines a first set of through-openings which are aligned with the first set of through-openings of the frame when the casters are positioned relative to the frame in the condition of use;
   the means for releasably securing includes a first pin having a shank which is positionable through the first set of aligned through-openings of the frame and the first set of through-openings of the caster for pinning the caster to the frame when the caster is positioned in the condition of use;
   the frame includes a second set of through-openings, and each caster defines a second set of through-openings which are aligned with the through-openings of the second set of through-openings of the frame when the casters are positioned relative to the frame in the out-of-the-way condition; and
   the means for releasably securing includes a second pin having a shank which is positionable through the aligned through-openings of the second set of frame through-openings and the through-opening of the second set of caster through-openings for pinning the caster to the frame when the caster is positioned in the out-of-the-way condition.

2. The material cart as defined in claim 1 wherein the base frame is substantially rectangular in shape and each wheel-including caster of the plurality of casters is mounted adjacent a corner of the base frame.

3. The material cart as defined in claim 2 wherein each of the plurality of wheel-supporting casters is joined to the base frame so that when the casters are moved to the out-of-the-way position, each wheel of the casters is positioned outboard of the base frame.

4. The material cart as defined in claim 1 wherein each caster includes a bearing plate disposed between the frame and the wheels of the casters and through which the weight of the frame of the material cart is transferred to the wheel of the caster so that no pivot pin used to secure the casters to the frame is required to support any appreciable weight of the frame of the material cart when the caster is positioned in the condition of use.

5. A material cart comprising:

a base frame which defines a bottom surface which lies substantially in a horizontal plane; and a plurality of wheel-including casters which are attached to the base frame in a manner which accommodates a movement of the wheels of the casters relative to the base frame between a condition of use at which the wheel of each caster engages the floor or underlying support surface to permit the base frame to be wheeled to an alternative site by way of the casters and an out-of-the-way condition at which no portion of the wheels of the casters is disposed beneath the horizontal plane in which the bottom surface of the base frame lies so that the bottom surface of the base frame can be lowered onto the floor or underlying support surface without interference from the wheels of the casters; and means for releasably securing the wheel-including casters to the base frame in at least one of the condition of use and the out-of-the-way condition;

wherein the frame includes a first set of through-openings, each caster defines a first set of through-openings which are aligned with the first set of through-openings of the frame when the casters are positioned relative to the frame in the condition of use;

the means for releasably securing includes a first pin having a shank which is positionable through the first set of aligned through-openings of the frame and the first set of through-openings of the caster for pinning the caster to the frame when the caster is positioned in the condition of use;

the frame includes a second set of through-openings, and each caster defines a second set of through-openings which are aligned with the through-openings of the second set of through-openings of the frame when the casters are positioned relative to the frame in the out-of-the-way condition; and the means for releasably securing includes a second pin having a shank which is positionable through the aligned through-openings of the second set of frame through-openings and the through-opening of the second set of caster through-openings for pinning the caster to the frame when the caster is positioned in the out-of-the-way condition.

6. The material cart as defined in claim 5 wherein the base frame is substantially rectangular in shape and each wheel-including caster of the plurality of casters is mounted adjacent a corner of the base frame.

7. The material cart as defined in claim 5 wherein each of the plurality of wheel-supporting casters is joined to the base frame so that when the casters are moved to the out-of-the-way position, each wheel of the casters is positioned outboard of the base frame.

8. The material cart as defined in claim 5 wherein each caster includes a bearing plate disposed between the frame and the wheels of the casters and through which the weight of the frame of the material cart is transferred to the wheel of the caster so that no pivot pin used to secure the casters to the frame is required to support any appreciable weight of the frame of the material cart when the caster is positioned in its condition of use.

9. The material cart as defined in claim 5 wherein the base frame includes two opposite sides and each wheel-including caster is pivotally attached to the base frame so that when each caster is moved from the condition of use to the out-of-the-way condition, the wheel of the caster is disposed outboard of the opposite sides of the base frame.

10. A material cart comprising:

a base frame which defines a bottom surface which lies substantially in a horizontal plane; and a plurality of wheel-including casters; and the casters are attached to the base frame with pivot pins which permit a pivotal movement of the wheel of each caster relative to the base frame between a condition of use at which the wheel of the caster engages the floor or underlying support surface and thereby permits the base frame to be wheeled to an alternative site and an out-of-the-way condition so that the bottom surface of the base frame can be lowered onto the floor or underlying support surface without interference from the wheels of the casters; and wherein each caster includes a bearing plate disposed between the base frame and the wheel of the caster and being disposed in such a relationship to the pivot pin so that when each caster is positioned in the condition of use, the weight of the frame is transferred to the wheel of the caster through the bearing plate rather than through the pivot pin used to pivotally secure the caster to the frame.

* * * * *